United States Patent
Li (10) Patent No.: US 11,641,446 B2
(45) Date of Patent: May 2, 2023

(54) METHOD FOR VIDEO FRAME INTERPOLATION, AND ELECTRONIC DEVICE

(71) Applicant: BEIJING BAIDU NETCOM SCIENCE TECHNOLOGY CO., LTD., Beijing (CN)

(72) Inventor: Chao Li, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 7 days.

(21) Appl. No.: 17/643,687

(22) Filed: Dec. 10, 2021

(65) Prior Publication Data

US 2022/0103782 A1 Mar. 31, 2022

(30) Foreign Application Priority Data

Dec. 11, 2020 (CN) .......................... 202011460415.9

(51) Int. Cl.
  *H04N 7/01* (2006.01)
  *G06T 7/246* (2017.01)
  *G06T 7/269* (2017.01)
(52) U.S. Cl.
  CPC ........... *H04N 7/0137* (2013.01); *G06T 7/246* (2017.01); *G06T 7/269* (2017.01); *H04N 7/0127* (2013.01); *G06T 2207/10016* (2013.01)
(58) Field of Classification Search
  CPC ...... H04N 7/0137; H04N 7/0127; H04N 7/01; H04N 7/0135; G06T 7/246; G06T 7/269;
  (Continued)

(56) References Cited

U.S. PATENT DOCUMENTS

2005/0226502 A1* 10/2005 Cohen .................... H04N 5/262
  382/173
2018/0091768 A1 3/2018 Adsumilli et al.
  (Continued)

FOREIGN PATENT DOCUMENTS

CN 109905624 A 6/2019
CN 111405316 A 7/2020
  (Continued)

OTHER PUBLICATIONS

Office Action issued in corresponding CN Application No. 202011460415.9 with English translation dated Aug. 10, 2022 (11 pages).
  (Continued)

*Primary Examiner* — Michael Lee
(74) *Attorney, Agent, or Firm* — Osha Bergman Watanabe & Burton LLP (57) ABSTRACT

The disclosure discloses a method for video frame interpolation. The method includes: obtaining a first visual semantic feature and first pixel information of a first frame, and obtaining a second visual semantic feature and second pixel information of a second frame; generating semantic optical flow information based on the first visual semantic feature and the second visual semantic feature; generating pixel optical flow information based on the first pixel information and the second pixel information; and generating an interpolation frame between the first frame and the second frame based on the semantic optical flow information and the pixel optical flow information, and interpolating the interpolation frame between the first frame and the second frame.

20 Claims, 7 Drawing Sheets

(58) Field of Classification Search
CPC . G06T 2207/10016; G06T 2207/20081; G06T 2207/20084; G06T 3/40; G06N 3/045; G06N 3/08
See application file for complete search history.

(56) References Cited

U.S. PATENT DOCUMENTS

| | | | |
|---|---|---|---|
| 2018/0146219 A1* | 5/2018 | Tsukagoshi | H04N 21/440281 |
| 2020/0034667 A1* | 1/2020 | Chen | G06F 18/217 |
| 2021/0064925 A1* | 3/2021 | Shih | G06N 3/045 |
| 2021/0329195 A1* | 10/2021 | Li | H04N 7/0137 |
| 2021/0344936 A1* | 11/2021 | Liu | H04N 19/1883 |
| 2021/0360252 A1* | 11/2021 | Li | G06F 18/214 |
| 2022/0092795 A1* | 3/2022 | Liu | G06T 7/269 |

FOREIGN PATENT DOCUMENTS

| | | |
|---|---|---|
| CN | 111654746 A | 9/2020 |
| CN | 111898701 A | 11/2020 |

OTHER PUBLICATIONS

Extended European Search Report issued in corresponding EP Application No. 21213649.3 dated May 4, 2022 (9 pages).
Dosovitskiy, Alexey et al. "FlowNet: Learning Optical Flow with Convolutional Networks" 2015 IEEE International Conference on Computer Vision, Dec. 7, 2015, XP032866621, pp. 2758-2766 (9 pages).

* cited by examiner

METHOD FOR VIDEO FRAME INTERPOLATION, AND ELECTRONIC DEVICE

CROSS-REFERENCE TO RELATED APPLICATION

The disclosure claims priority to Chinese Patent Application No. 202011460415.9, filed on Dec. 11, 2020, the content of which is hereby incorporated by reference into this disclosure.

FIELD

Embodiments of the disclosure relate to a field of image processing technologies, and more particularly to a field of artificial intelligence technologies such as computer vision and deep learning.

BACKGROUND

With rise of mobile Internet, a way users store and forward information has gradually transitioned from texts or images to videos. The video becomes a main carrier of user-generated content. Presently, a frame rate of most videos is 24-30 fps, which is a far from visual experience of high frame rate (60, 120 fps) videos. Therefore, video frame interpolation technologies come into being. With the video frame interpolation technologies, the video frame rate is increased by interpolating an intermediate frame between video frames, making the video watch smoothly, reducing jumping and jitter and other phenomena.

SUMMARY

The disclosure provides a method and an apparatus for video frame interpolation, and an electronic device.

According to a first aspect, a method for video frame interpolation is provided. The method includes: obtaining a first visual semantic feature and first pixel information of a first frame, and obtaining a second visual semantic feature and second pixel information of a second frame, in which the first frame and the second frame are adjacent frames in a video; generating semantic optical flow information based on the first visual semantic feature and the second visual semantic feature; generating pixel optical flow information based on the first pixel information and the second pixel information; and generating an interpolation frame between the first frame and the second frame based on the semantic optical flow information and the pixel optical flow information, and interpolating the interpolation frame between the first frame and the second frame.

According to a second aspect, an electronic device is provided. The electronic device includes: at least one processor and a memory. The memory is communicatively coupled to the at least one processor. The memory is configured to store instructions executable by the at least one processor. The at least one processor is caused to implement the method for video frame interpolation according to the first aspect of the disclosure when the instructions are executed by the at least one processor.

According to a third aspect, a non-transitory computer readable storage medium having computer instructions stored thereon is provided. The computer instructions are configured to cause a computer to execute the method for video frame interpolation according to the first aspect of the disclosure.

It should be understood that, content described in the Summary is not intended to identify key or important features of embodiments of the disclosure, nor is it intended to limit the scope of the disclosure. Other features of the disclosure will become apparent from the following description.

BRIEF DESCRIPTION OF THE DRAWINGS

The accompanying drawings are used for better understanding the solution and do not constitute a limitation of the disclosure.

DETAILED DESCRIPTION

Description will be made below to exemplary embodiments of the disclosure with reference to accompanying drawings, which includes various details of embodiments of the disclosure to facilitate understanding and should be regarded as merely examples. Therefore, it should be recognized by the skilled in the art that various changes and modifications may be made to the embodiments described herein without departing from the scope and spirit of the disclosure. Meanwhile, for clarity and conciseness, descriptions for well-known functions and structures are omitted in the following description.

Brief description will be made below to the technical field involved in the solution of the disclosure.

Image processing refers to a technology of analyzing an image with a computer to achieve a desired result. The image processing generally refers to digital image processing. A digital image refers to a large two-dimensional array captured by a device such as an industrial camera, a video camera, or a scanner. An element of the two-dimensional array is called a pixel. A value of the pixel is called a gray value. Image processing technologies generally include image compression, image enhancement and restoration, and image matching, image description and image recognition.

AI (artificial intelligence) is a subject that studies simulating certain thinking processes and intelligent behaviors (such as learning, reasoning, thinking, and planning) of human by using the computer. The AI relates to both hardware and software technologies. The hardware technologies of the artificial intelligence generally include some aspects such as computer vision technologies, speech recognition technologies, natural language processing technologies and learning/deep learning, big data processing technologies, and knowledge map technologies.

DL (deep learning) is a new research direction in machine learning (ML), which is introduced into machine learning to make it closer to the original goal, i.e., artificial intelligence. DL is learning an inherent law and representation levels of sample data. Information obtained in the learning process is of great help to interpretation of data such as texts, images and sounds. An ultimate goal of the deep learning is to enable a machine to have an analytical learning ability like human beings, and to recognize data such as texts, images and sounds. The deep learning is a complex machine learning algorithm, and has achieved far more results in speech and image recognition than previous related technologies.

Computer vision is a science that studies how to enable the machine to "see". Further, it means that the camera and the computer are used instead of human eyes to perform recognition, tracking and measurement on a target, and further to perform image processing, such that the computer can process and obtain an image more suitable for human eye observation or sending to an instrument for detection. As a scientific subject, the computer vision tries to establish an artificial intelligence system that may obtain "information" from an image or multidimensional data by studying related theories and technologies. The information here is defined by Shannon, and may be used to help make a "decision". Perception may be regarded as extracting information from a sensory signal, therefore, the computer vision may also be regarded as a science for studying how to enable an artificial system to "perceive" from the image or the multidimensional data.

With the video frame interpolation technologies, the video frame rate is increased by interpolating an intermediate frame between video frames, making the video watch smoothly, reducing jumping and jitter and other phenomena, thereby greatly improving the user experience.

However, when the frame interpolation is performed based on an existing video frame interpolation method, there is often a case such as low computational efficiency or serious image distortion. As a result, it may leads to some problems such as poor frame interpolation effect and low efficiency exist during video frame interpolation. Therefore, how to improve the efficiency and effect of video frame interpolation becomes one of the important research directions.

Description will be made below to a method and an apparatus for video frame interpolation, and an electronic device according to embodiments of the disclosure with reference to accompanying drawings.

Figure 1:
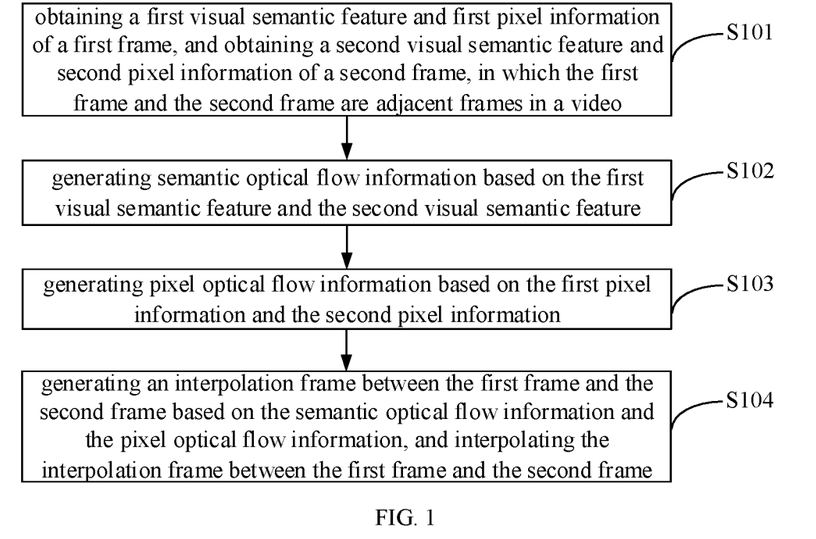
FIG. 1 is a flow chart according to a first embodiment of the disclosure.

FIG. 1 is a flow chart according to a first embodiment of the disclosure. It should be noted that, a method for video frame interpolation according to embodiments of the disclosure may be executed by an apparatus for video frame interpolation according to embodiments of the disclosure. The apparatus may be configured in an electronic device. As illustrated in FIG. 1, the method for video frame interpolation provided by embodiments may include followings.

At block S101, a first visual semantic feature and first pixel information of a first frame are obtained, and a second visual semantic feature and second pixel information of a second frame are obtained. The first frame and the second frame are adjacent frames in a video.

In embodiments of the disclosure, the visual semantic features of the first frame and the second frame in the video may be extracted, and semantic information such as objects, people, foreground and background in the first frame and the second frame may be used to serve for frame interpolation.

For example, visual semantic features of a $t^{th}$ frame and a $(t+1)^{th}$ frame in the video may be extracted, and the semantic information such as objects, people, foreground and background in the $t^{th}$ and $(t+1)^{th}$ frames may be used to serve for frame interpolation.

The video may include multiple frames, i.e., multiple single images. The video may be any video on which the user wants to perform video frame interpolation to improve a playing fluency of the video.

The pixel information may include information such as color and brightness of a pixel.

In embodiments of the disclosure, when trying to obtain the video, the video may be obtained by the electronic device. In some embodiments, the electronic device may obtain the video from a storage area of the electronic device when the electronic device is a video providing device. In a possible implementation, the electronic device may obtain the video from a video providing device when the electronic device is a display device. For example, the electronic device may download the video from the video providing device based on a uniform resource locator (URL) corresponding to the video. In another possible implementation, the electronic device has a video stored thereon, and the electronic device may obtain the video from its own storage area. In another possible implementation, the electronic device may capture a video through a built-in camera to obtain the video.

Further, after the video is obtained, any two adjacent frames in the video, i.e., the first frame and the second frame, may be obtained by executing a preset application.

It should be noted that, a detailed method for obtaining the first visual semantic feature and the second visual semantic feature is not limited in the disclosure, which may be selected based on an actual condition.

In some embodiments, after the first frame and the second frame in the video are obtained, entity detection may be performed to obtain an attribute of each entity, and then the first visual semantic feature and the second visual semantic feature may be obtained by previous-and-next detection processing. The previous-and-next detection may use a previous-and-next frames correlation algorithm. During the acquisition process, the target detection box is prone to jitter. The jitter of the target detection box may be reduced by using the previous-and-next frames correlation algorithm.

The visual semantic feature may also refers to visual semantic information, such as the texture, color, or a target category of an image. The semantics of an image includes visual layer semantics, object layer semantics, and conceptual layer semantics. The visual layer semantics is generally understood as the bottom layer, i.e., color, texture, shape, etc. These features are called the bottom-level feature semantics. The object layer is the middle layer, which usually contains attribute features, etc., i.e., a state of an object at a certain moment. The conceptual layer is the high level, which is the closest to human understanding expressed by images. For example, there are sand, blue sky, and sea water on a picture. The visual layer is various regions in the picture. The object layer is the sand, the blue sky and the sea water. The conceptual layer is the beach. These are the semantics of the picture.

In some embodiments, after the first frame and the second frame in the video are obtained, the first frame and the second frame may be input into a pre-trained semantic segmentation model to respectively obtain a first visual semantic feature map of the first frame and a second visual semantic feature map of the second frame. Then, the first visual semantic feature is extracted from the first visual semantic feature map, and the second visual semantic feature is extracted from the second visual semantic feature map. The first visual semantic feature map and the second visual semantic feature map respectively have a same size as original frames (the first frame and the second frame).

It should be noted that, a detailed method for obtaining the first pixel information and the second pixel information is not limited in the disclosure, which may be selected based on an actual condition.

In some embodiments, after the first frame and the second frame in the video are obtained, convolution may be performed on the two frames by employing a CNN (convolution neural network) to obtain the first pixel information and the second pixel information.

At block S102, semantic optical flow information is generated based on the first visual semantic feature and the second visual semantic feature.

It should be noted that, in the related art, video frame interpolation is often implemented based on a simple optical flow network (FlowNetSimple). In other words, in the related art, optical flow learning is generally performed only for the pixel information. In this way, it may cause problems such as easy deformation and occlusion difficult to deal with. Therefore, in the disclosure, the optical flow learning may be performed based on both the first visual semantic feature and the second visual semantic feature. That is, optical flow operation may be performed based on the visual semantic features to generate the semantic optical flow information.

The semantic optical flow information refers to information obtained by performing optical flow learning based on the visual semantic features.

The optical flow learning refers to a method for obtaining a correspondence between a current frame and a previous frame by using a change of a pixel in an image sequence in a time domain and a correlation between adjacent frames, and calculating motion information of an object between the adjacent frames based on the correspondence.

It should be noted that, a detailed method for generating the semantic optical flow information is not limited in the disclosure, which may be selected based on an actual condition. For example, a sparse optical flow may be obtained for a semantic static feature point based on the first visual semantic feature and the second visual semantic feature to generate the semantic optical flow information.

At block S103, pixel optical flow information is generated based on the first pixel information and the second pixel information.

In embodiments of the disclosure, optical flow learning may be performed based on the first pixel information and the second pixel information to generate the pixel optical flow information.

It should be noted that, a detailed method for generating the pixel optical flow information is not limited in the disclosure, which may be selected based on an actual condition. For example, based on the first pixel information and the second pixel information, a pixel optical flow field (dx, dy) may be obtained by performing spatial interpolation processing on a two-dimensional motion vector of a video frame block, and the pixel optical flow field is taken as the pixel optical flow information.

At block S104, an interpolation frame between the first frame and the second frame is generated based on the semantic optical flow information and the pixel optical flow information, and the interpolation frame is interpolated between the first frame and the second frame.

It should be noted that, in the disclosure, a detailed method for generating the interpolation frame between the first frame and the second frame based on the semantic optical flow information and the pixel optical flow information is not limited in the disclosure, which may be selected based on an actual condition. For example, the semantic optical flow information and the pixel optical flow information may be spliced and integrated together in a channel dimension, and then input into a preset frame interpolation network to generate the interpolation frame. The preset frame interpolation network may be calibrated based on an actual condition. For example, the preset frame interpolation network may be constituted by a deep convolution network, which is not limited here.

With the method for video frame interpolation according to embodiments of the disclosure, the first visual semantic feature and the first pixel information of the first frame may be obtained, and the second visual semantic feature and the second pixel information of the second frame may be obtained. The semantic optical flow information is generated based on the first visual semantic feature and the second visual semantic feature. The pixel optical flow information is generated based on the first pixel information and the second pixel information. The interpolation frame between the first frame and the second frame is generated based on the semantic optical flow information and the pixel optical flow information, and interpolated between the first frame and the second frame. In this way, with the disclosure, generation of the pixel optical flow information no longer merely depends on the simple optical flow learning, and then the interpolation frame is generated. The interpolation frame is generated based on the semantic optical flow information and the pixel optical flow information, which avoids problems such as low efficiency, image jittering, blurring and serious deformation of the video in the existing method for video frame interpolation, and improves the efficiency and frame interpolation effect in the process of video frame interpolation.

It should be noted that, in the disclosure, generating the semantic optical flow information based on the first visual semantic feature and the second visual semantic feature and generating the pixel optical flow information based on the first pixel information and the second pixel information may be implemented by performing optical flow learning.

Figure 2:
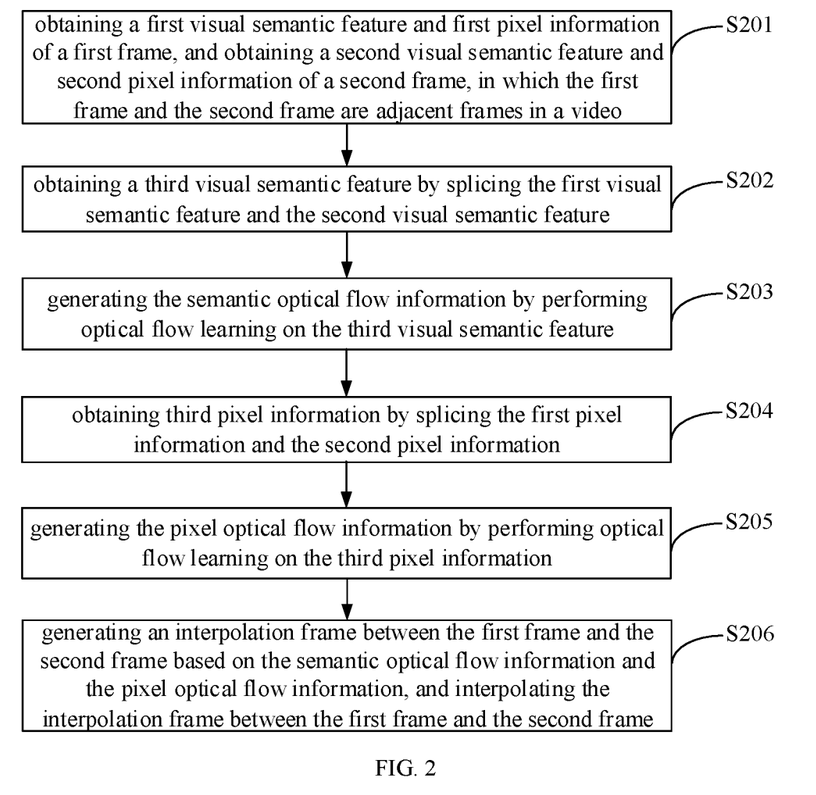
FIG. 2 is a flow chart according to a second embodiment of the disclosure.

FIG. 2 is a flow chart according to a second embodiment of the disclosure. As illustrated in FIG. 2, on the basis of the above embodiment, the method for video frame interpolation provided by embodiments may include followings.

At block S201, a first visual semantic feature and first pixel information of a first frame are obtained, and a second visual semantic feature and second pixel information of a second frame are obtained. The first frame and the second frame are adjacent frames in a video.

The action at block S201 is the same as that at block S101 in the above embodiment, which is not be elaborated here.

The action at block S102 in the above embodiment may include actions at blocks S202~S203.

At block S202, a third visual semantic feature is obtained by splicing the first visual semantic feature and the second visual semantic feature.

Figure 3:
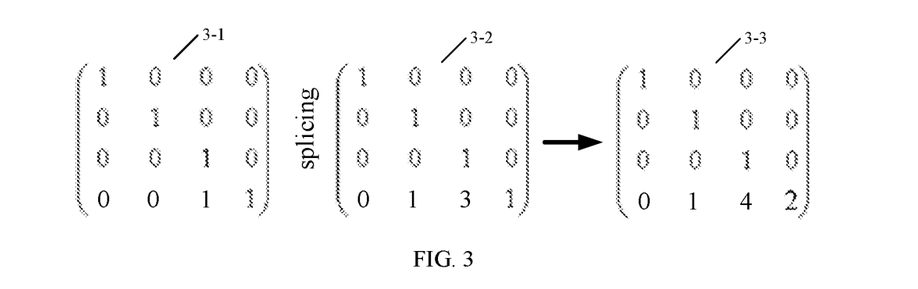
FIG. 3 is a schematic diagram illustrating splicing visual semantic features.

For example, as illustrated in FIG. 3, the first visual semantic feature and the second visual semantic feature are represented by a matrix 3-1 and a matrix 3-2 respectively. In this case, the third visual semantic feature may be generated by splicing the matrix 3-1 and the matrix 3-2, and illustrated as a matrix 3-3.

At block S203, the semantic optical flow information is generated by performing optical flow learning on the third visual semantic feature.

In embodiments of the disclosure, optical flow learning may be performed on the third visual semantic feature to generate the semantic optical flow information.

It should be noted that, a detailed method for generating the semantic optical flow information by performing the optical flow learning on the third visual semantic feature is not limited in the disclosure, which may be selected based on an actual condition. For example, the third visual semantic feature obtained by splicing may be input into a pre-trained semantic optical flow model to generate the semantic optical flow information.

The action at block S103 in the above embodiment may include actions at blocks S204-S205.

At block S204, third pixel information is obtained by splicing the first pixel information and the second pixel information.

Figure 4:
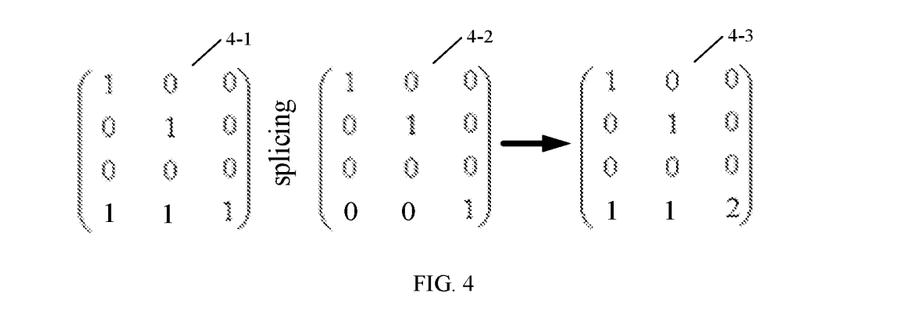
FIG. 4 is a schematic diagram schematic diagram splicing pixel information.

For example, as illustrated in FIG. 4, the obtained first pixel information and the second pixel information are represented by a matrix 4-1 and a matrix 4-2 respectively. In this case, the third pixel information may be generated by splicing the matrix 4-1 and the matrix 4-2, and illustrated as a matrix 4-3.

At block S205, the pixel optical flow information is generated by performing optical flow learning on the third pixel information.

In embodiments of the disclosure, the optical flow learning may be performed on the third pixel information to generate the pixel optical flow information.

It should be noted that, in the disclosure, a detailed method for generating the pixel optical flow information by performing the optical flow learning on the third pixel information is not limited in the disclosure, which may be selected based on an actual condition. For example, the third pixel information may be input into a pre-trained pixel optical flow model to generate the pixel optical flow information.

At block S206, an interpolation frame between the first frame and the second frame is generated based on the semantic optical flow information and the pixel optical flow information, and the interpolation frame is interpolated between the first frame and the second frame.

The action at block S206 is the same as that at block S104 in the above embodiments, which is not elaborated here.

With the method for video frame interpolation according to embodiments of the disclosure, the third visual semantic feature and the third pixel information are obtained by splicing, and then the semantic optical flow information and the pixel optical flow information are generated by performing the optical flow learning on the third pixel information. In this way, in the disclosure, the interpolation frame may be generated based on the semantic optical flow information and the pixel optical flow information, thereby avoiding problems such as low efficiency, image jittering, blurring and serious deformation of the video in the existing method for video frame interpolation, and improving the efficiency in the process of video frame interpolation and the frame interpolation effect.

It should be noted that, in the disclosure, generating the interpolation frame between the first frame and the second frame based on the semantic optical flow information and the pixel optical flow information may be implemented by performing processing such as mapping and frame generation.

Figure 5:
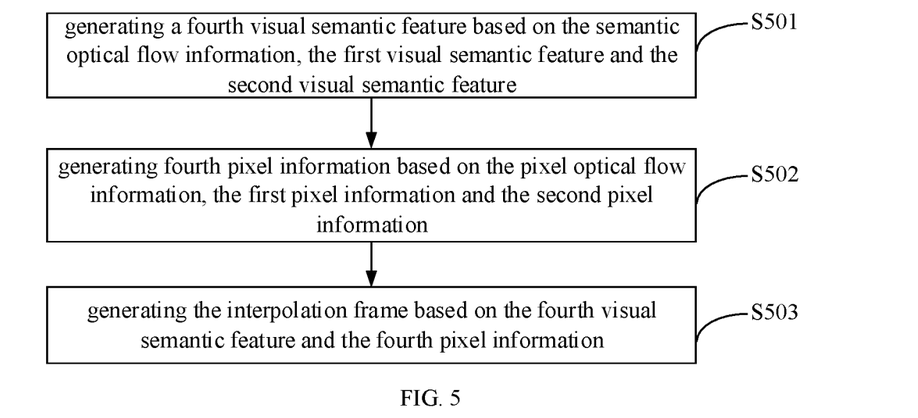
FIG. 5 is a flow chart according to a third embodiment of the disclosure.

FIG. 5 is a flow chart according to a third embodiment of the disclosure. As illustrated in FIG. 5, on the basis of the above embodiments, the detailed process for generating the interpolation frame includes followings.

At block S501, a fourth visual semantic feature is generated based on the semantic optical flow information, the first visual semantic feature and the second visual semantic feature.

Figure 6:
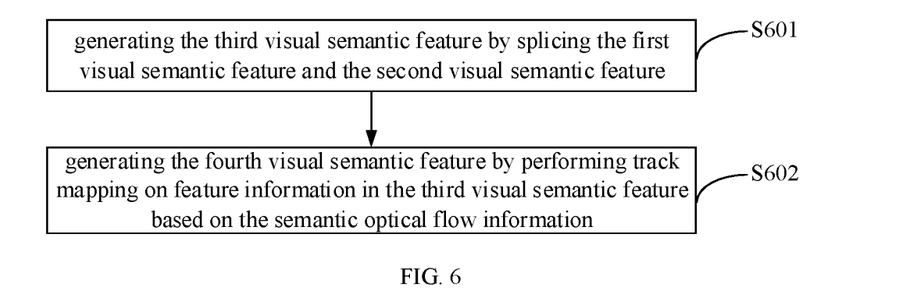
FIG. 6 is a flow chart according to a fourth embodiment of the disclosure.

As a possible implementation, as illustrated in FIG. 6, on the basis of the above embodiments, the action at block S501 includes followings At block S601, the third visual semantic feature is generated by splicing the first visual semantic feature and the second visual semantic feature.

The action at block S601 is the same as that at block S202, which is not elaborated here.

At block S602, the fourth visual semantic feature is generated by performing track mapping on feature information in the third visual semantic feature based on the semantic optical flow information.

The track mapping refers to a mapping method for implementing a corresponding motion process based on the feature information.

In embodiments of the disclosure, based on the semantic optical flow information, the feature information corresponding to the first frame and the feature information corresponding to the second frame in the third visual semantic feature may be mapped into the interpolation frame to generate the fourth visual semantic feature. The fourth visual semantic feature corresponds to a visual semantic feature of the interpolation frame.

At block S502, fourth pixel information is generated based on the pixel optical flow information, the first pixel information and the second pixel information.

Figure 7:
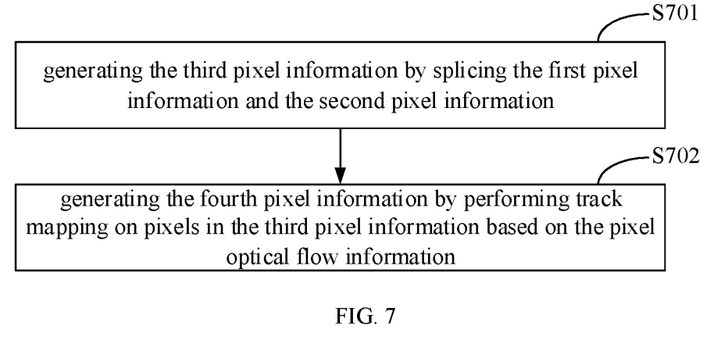
FIG. 7 is a flow chart according to a fifth embodiment of the disclosure.

As a possible implementation, as illustrated in FIG. 7, on the basis of the above embodiments, the action at block S502 may include followings.

At block S701, the third pixel information is generated by splicing the first pixel information and the second pixel information.

The action at block S701 is the same as that the block S204, which is not elaborated here.

At block S702, the fourth pixel information is generated by performing track mapping on pixels in the third pixel information based on the pixel optical flow information.

In embodiments of the disclosure, based on the pixel optical flow information, pixels corresponding to the first frame and pixels corresponding to the second frame in the third pixel information may be mapped into the interpolation frame to generate the fourth pixel information. The fourth pixel information corresponds to pixel information of the interpolation frame.

At block S503, the interpolation frame is generated based on the fourth visual semantic feature and the fourth pixel information.

In embodiments of the disclosure, the interpolation frame may be generated by a frame generating model based on the fourth visual speech feature and the fourth pixel information. The frame generating model may include multiple networks.

Figure 8:
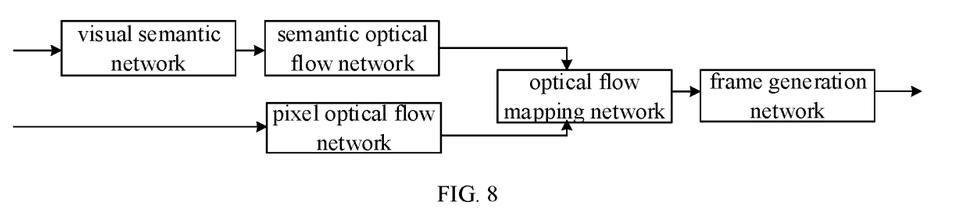
FIG. 8 is a block diagram illustrating a frame generating model.

For example, as illustrated in FIG. 8, the frame generating model may include following five networks: a visual semantic network, a semantic optical flow network, a pixel optical flow network, an optical flow mapping network and a frame generating network.

The visual semantic network may extract visual semantic features of adjacent frames in the video, i.e., the first visual semantic feature and the second visual semantic feature, and serve for frame interpolation by using semantic information such as objects, characters, foreground and background in the frames of the video.

The semantic optical flow network may perform optical flow operation based on a visual semantic feature of a $(t-1)^{th}$ frame and a visual semantic feature of a $(t+1)^{th}$ frame, i.e., the first visual semantic feature and the second visual semantic feature, to obtain the semantic optical flow information.

The pixel optical flow network may perform optical flow operation based on basic pixel information of the $(t-1)^{th}$ frame and basic pixel information of the $(t+1)^{th}$ frame, i.e., the first pixel information and the second pixel information, to obtain the pixel optical flow information.

The optical flow mapping network may perform mapping operation based on the visual semantic feature and the pixel optical flow information of the $(t-1)^{th}$ frame, the visual semantic feature and the pixel optical flow information of the $(t+1)^{th}$ frame, the semantic optical flow information and the pixel optical flow information, to obtain a visual semantic feature and pixel optical flow information corresponding to a $t^{th}$ frame (i.e., the interpolation frame).

The frame generating network may generate the $t^{th}$ frame, i.e., a finally inserted $t^{th}$ frame, based on the visual semantic feature and the pixel optical flow information corresponding to the $t^{th}$ frame generated by the optical flow mapping network.

In order to improve the accuracy of video frame interpolation and further improve the effect of video frame interpolation to enable frames in the video subjected to the interpolation frame more coherent, in some embodiments of the disclosure, interpolation frame information of the interpolation frame may be generated through a frame interpolation model. The frame interpolation model may be obtained through training, which is not limited here.

In embodiments of the disclosure, the training and generation of the frame interpolation model may be performed by a related server. The server may be a cloud server or a mainframe of a computer. A communication connection may be established between the server and an electronic device capable of performing the method for video frame interpolation according to embodiments of the disclosure. The communication connection may be at least one of a wireless network connection and a wired network connection. The server may send the trained frame interpolation model to the electronic device, such that the electronic device may call the trained frame interpolation model when necessary, thereby greatly reducing the calculation pressure of the electronic device. In addition, a frame interpolation task of the video is assisted by the frame interpolation model, which may also improve the accuracy of video frame interpolation.

Figure 9:
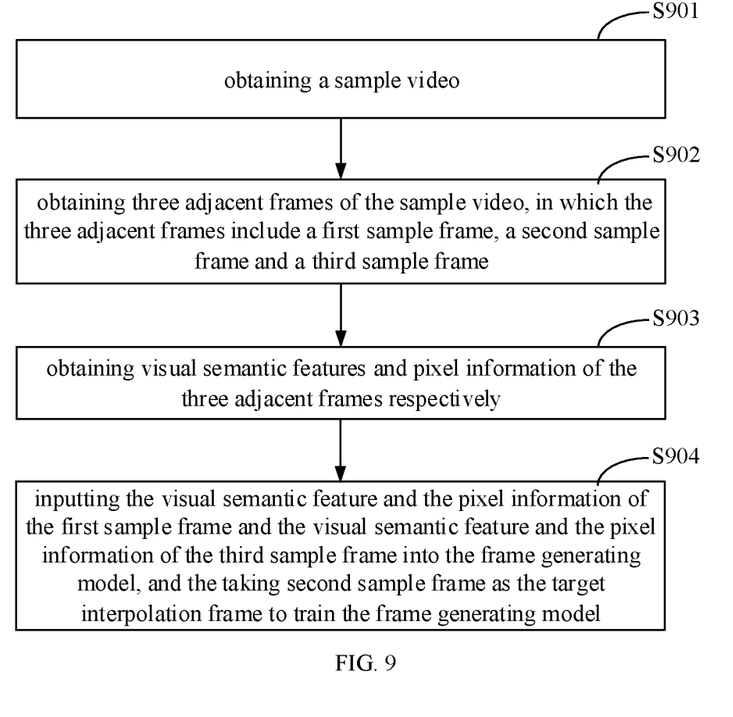
FIG. 9 is a flow chart according to a sixth embodiment of the disclosure.

In detail, as illustrated in FIG. 9, the frame interpolation model may be generated in a following way.

At block 901, a sample video is obtained.

In embodiments of the disclosure, a server may obtain the sample video. In some embodiments, the sample video may be a professional training video provided by an engineer, or a training video for a target video that needs frame interpolation in this time, such that the trained frame interpolation model may better assist the frame interpolation task of the video.

At block 902, three adjacent frames of the sample video are obtained. The three adjacent frames include a first sample frame, a second sample frame and a third sample frame.

In embodiments of the disclosure, the server may obtain a $(t-1)^{th}$ frame, a $t^{th}$ frame and a $(t+1)^{th}$ frame of the sample video, where t may be a positive integer.

At block 903, visual semantic features and pixel information of the three adjacent frames are obtained respectively.

In embodiments of the disclosure, the server may obtain a visual semantic feature and pixel information of the $(t-1)^{th}$ frame, a visual semantic feature and pixel information of the $t^{th}$ frame and a visual semantic feature and pixel information of the $(t+1)^{th}$ frame respectively.

At block 904, the visual semantic feature and the pixel information of the first sample frame and the visual semantic feature and the pixel information of the third sample frame are input into the frame generating model, and the second sample frame is taken as the target interpolation frame to train the frame generating model.

In embodiments of the disclosure, the server may input the visual semantic feature and the pixel information of the $(t-1)^{th}$ frame and the visual semantic feature and the pixel information of the $(t+1)^{th}$ frame into the frame interpolation model, and train the frame interpolation model by taking the $t^{th}$ frame as the target interpolation frame.

Description will be made in detail below to a training process of the frame interpolation model with reference to FIG. 10.

Figure 10:
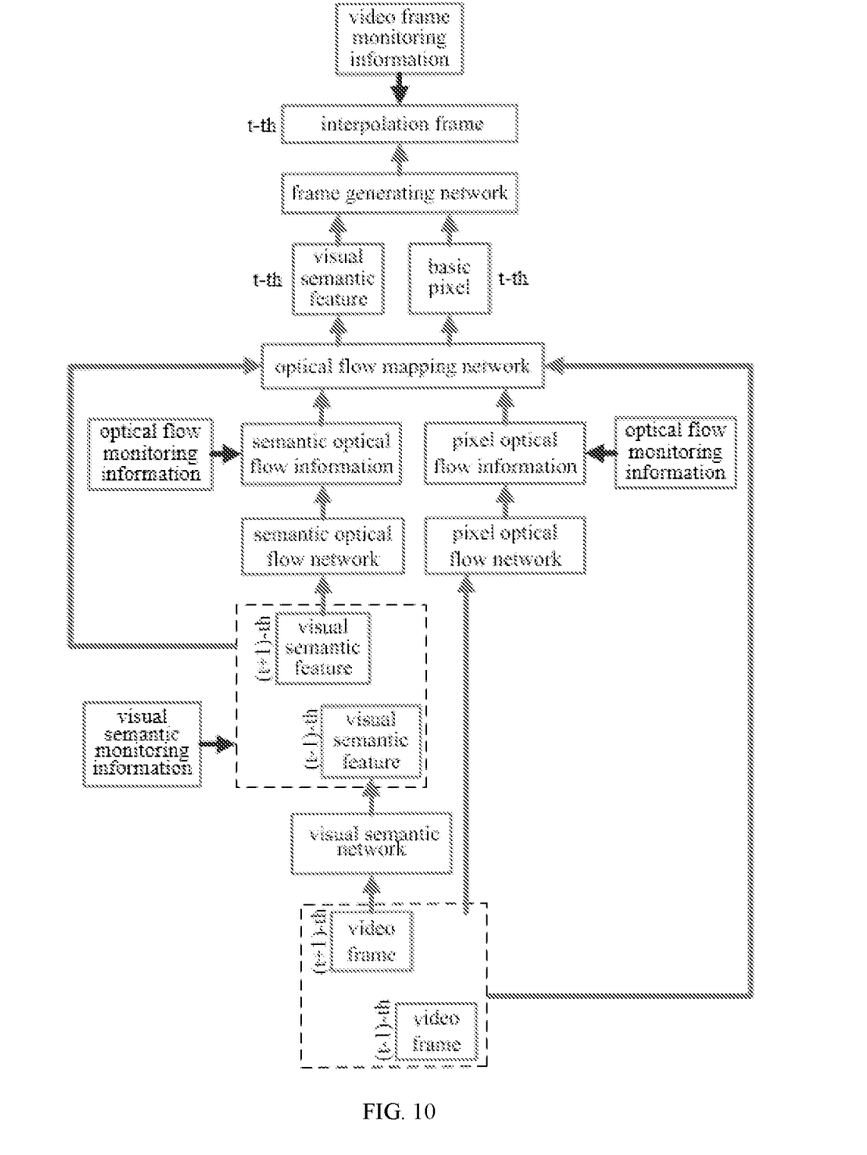
FIG. 10 is a block diagram illustrating a training process for a frame generating model.

As illustrated in FIG. 10, the server obtains a sample video, and obtains any three adjacent frames in the sample video, i.e., a $(t-1)^{th}$ frame, a $t^{th}$ frame and a $(t+1)^{th}$ frame. Then, the server obtains the a visual semantic feature of the $(t-1)^{th}$ frame, a visual semantic feature of the $t^{th}$ frame and a visual semantic feature of the $(t+1)^{th}$ frame respectively through a visual semantic network for training. The server obtains semantic optical flow information and pixel optical flow information of the $(t-1)^{th}$ frame, semantic optical flow information and pixel optical flow information of the $(t-1)^{th}$ frame, and semantic optical flow information and pixel optical flow information of the $(t+1)^{th}$ frame respectively through a semantic optical flow network and a pixel optical flow network for training. Meanwhile, a visual semantic monitoring program and an optical flow monitoring program are installed in the server to monitor the visual semantic features, the semantic optical flow information and the pixel optical flow information of the $(t-1)^{th}$ and $(t+1)^{th}$ frames, to ensure the accuracy of the visual semantic features, the semantic optical flow information and the pixel optical flow information of the $(t-1)^{th}$ and $(t+1)^{th}$ frames.

Further, the server inputs the semantic optical flow information and the pixel optical flow information of the $(t-1)^{th}$ and $(t+1)^{th}$ frames into an optical flow mapping network to obtain visual semantic features and pixel optical flow information of the $(t-1)^{th}$ and $(t+1)^{th}$ frames.

Further, the server inputs the visual semantic features and the pixel optical flow information of the $(t-1)^{th}$ and $(t+1)^{th}$ frames into a frame generating network to obtain an interpolation frame t' of the video. Meanwhile, a video frame monitoring program is installed in the server to monitor the interpolation frame t' to ensure the accuracy of the interpolation frame t'.

Therefore, the server takes the $(t-1)^{th}$ frame and the $(t+1)^{th}$ frame as input of the frame interpolation model and takes the $t^{th}$ frame as a target interpolation frame to train the frame interpolation model. For example, the visual semantic features and the pixel optical flow information of the $(t-1)^{th}$ and $(t+1)^{th}$ frames are respectively compared with the visual semantic feature and the pixel optical flow information of the $t^{th}$ frame to determine displacement changes and scene changes of each object in the $t^{th}$ frame with respect to the previous frame and the following frame, and the displacement changes and the scene changes are taken as training data for training the frame interpolation model to improve the training effect.

It should be noted that the method for video frame interpolation provided in the disclosure may be applied to various scenes.

For a scene of removing a watermark from a video, any two adjacent frames in a video to be processed (a video selected by a user to try to remove the watermark) may be taken as the first frame and the second frame. In some embodiments, in order to shorten a time consumption of removing the watermark, the video may be preprocessed to determine a video frequency brand carrying the watermark as a target video. Further, any two adjacent frames in the target video may be taken as the first frame and the second frame.

Further, a first visual semantic feature and first pixel information of the first frame and a second visual semantic feature and second pixel information of the second frame may be obtained based on AI technologies such as computer vision and DL. Then semantic optical flow information is generated based on the first visual semantic feature and the second visual semantic feature, and pixel optical flow information is generated based on the first pixel information and the second pixel information. An interpolation frame between the first frame and the second frame is generated based on the semantic optical flow information and the pixel optical flow information, and the interpolation frame is interpolated between the first frame and the second frame, such that the watermark removal effect is ensured, and the image jittering, blurring and serious deformation of the video are avoided, improving the user experience is improved.

With the method for video frame interpolation according to embodiments of the disclosure, generating the pixel optical flow information no longer only depends on the simple optical flow learning to generate the interpolation frame, the interpolation frame is generated based on the semantic optical flow information and the pixel optical flow information by fully extracting and using the visual semantic information in the video. In this way, problems such low efficiency, and image jittering, blurring and serious deformation of the video in the existing method for video frame interpolation are avoided, the efficiency in the process of video frame interpolation is improved, and the frame interpolation effect is improved. Furthermore, unified supervision training is performed in a frame interpolation scene, which further improves the frame interpolation effect.

Embodiments of the disclosure also provide an apparatus for video frame interpolation corresponding to the method for video frame interpolation provided in the above embodiments. Since the apparatus for video frame interpolation provided in this embodiment corresponds to the method for video frame interpolation provided in the above embodiments, implementation of the method for video frame interpolation are also applicable to the apparatus for video frame interpolation provided in this, which is not described in detail in the apparatus embodiments.

Figure 11:
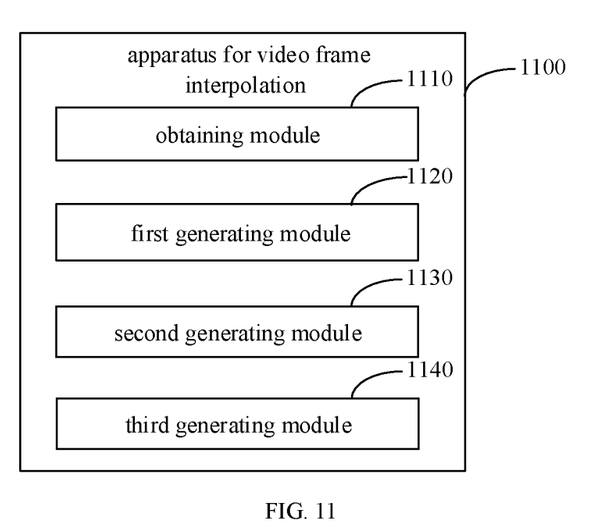
FIG. 11 is a block diagram illustrating an apparatus for video frame interpolation capable of implementing a method for video frame interpolation according to embodiments of the disclosure.

FIG. 11 is a block diagram illustrating an apparatus for video frame interpolation capable of implementing a method for video frame interpolation according to embodiments of the disclosure.

As illustrated in FIG. 11, the apparatus 1100 for video frame interpolation includes: an obtaining module 1100, a first generating module 1120, a second generating module 1130, and a third generating module 1140.

The obtaining module 1100 is configured to obtain a first visual semantic feature and first pixel information of a first frame, and obtain a second visual semantic feature and second pixel information of a second frame. The first frame is adjacent to the second frame in a video.

The first generating module 1120 is configured to generate semantic optical flow information based on the first visual semantic feature and the second visual semantic feature.

The second generating module 1130 is configured to generate pixel optical flow information based on the first pixel information and the second pixel information.

The third generating module 1140 is configured to generate an interpolation frame between the first frame and the second frame based on the semantic optical flow information and the pixel optical flow information, and to interpolate the interpolation frame between the first frame and the second frame.

Figure 12:
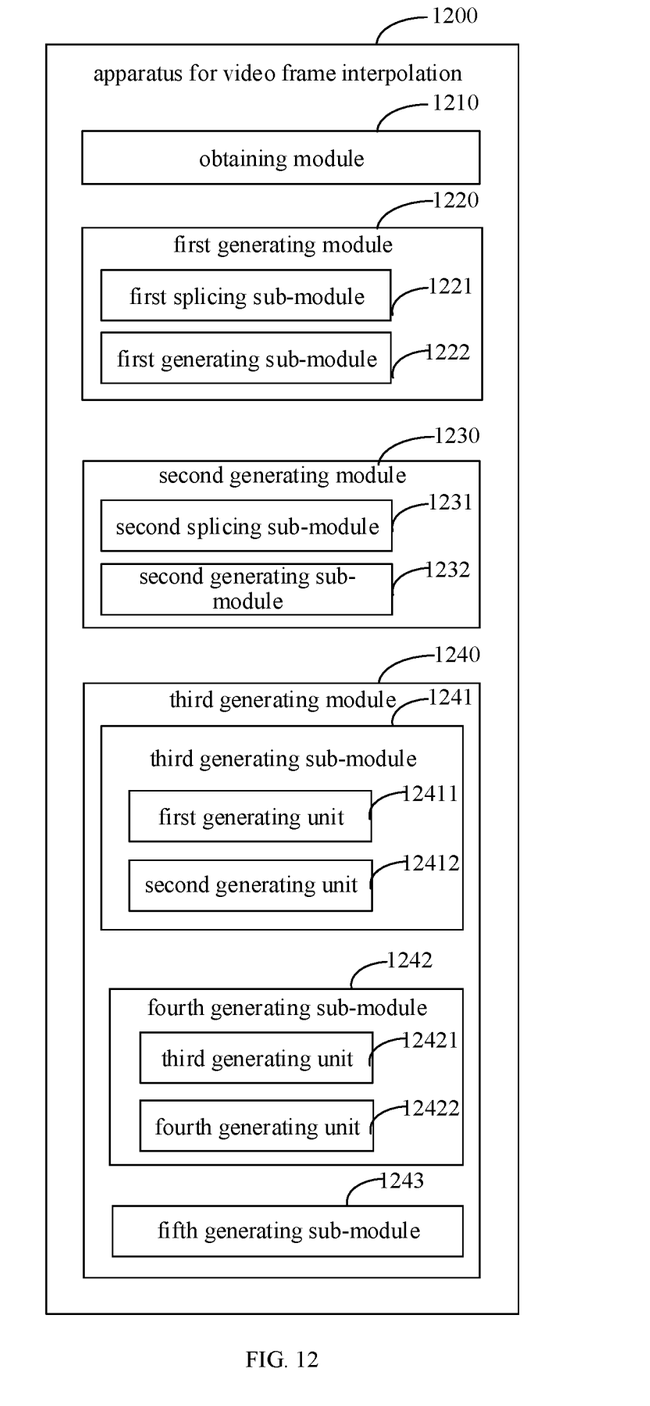
FIG. 12 is a block diagram illustrating an apparatus for video frame interpolation capable of implementing a method for video frame interpolation according to embodiments of the disclosure.

FIG. 12 is a block diagram illustrating an apparatus for video frame interpolation capable of implementing a method for video frame interpolation according to embodiments of the disclosure.

As illustrated in FIG. 12, the apparatus 1200 for video frame interpolation includes: an obtaining module 1210, a first generating module 1220, a second generating module 1230, and a third generating module 1240.

The first generating module 1220 includes: a first splicing sub-module 1221 and a first generating sub-module 1222.

The first splicing sub-module 1221 is configured to obtain a third visual semantic feature by splicing the first visual semantic feature and the second visual semantic feature.

The first generating sub-module 1222 is configured to generate the semantic optical flow information by performing optical flow learning on the third visual semantic feature.

The second generating module 1230 includes: a second splicing sub-module 1231 and a second generating sub-module 1232.

The second splicing sub-module 1231 is configured to obtain third pixel information by splicing the first pixel information and the second pixel information.

The second generating sub-module 1232 is configured to generate the pixel optical flow information by performing optical flow learning on the third pixel information.

The third generating module 1240 includes: a third generating sub-module 1241, a fourth generating sub-module 1242, and a fifth generating sub-module 1243.

The third generating sub-module 1241 is configured to generate a fourth visual semantic feature based on the semantic optical flow information, the first visual semantic feature and the second visual semantic feature.

The fourth generating sub-module 1242 is configured to generate fourth pixel information based on the pixel optical flow information, the first pixel information and the second pixel information.

The fifth generating sub-module 1243 is configured to generate the interpolation frame based on the fourth visual semantic feature and the fourth pixel information.

The third generating sub-module 1241 includes: a first generating unit 12411 and a second generating unit 12412.

The first generating unit 12411 is configured to generate the third visual semantic feature by splicing the first visual semantic feature and the second visual semantic feature.

The second generating unit 12412 is configured to generate the fourth visual semantic feature by performing track mapping on feature information in the third visual semantic feature based on the semantic optical flow information.

The fourth generating sub-module 1242 includes: a third generating unit 12421 and a fourth generating unit 12422.

The third generating unit 12421 is configured to generate the third pixel information by splicing the first pixel information and the second pixel information.

The fourth generating unit 12422 is configured to generate the fourth pixel information by performing track mapping on pixels in the third pixel information based on the pixel optical flow information.

It should be noted that the obtaining module 1210 has the same function and structure as the obtaining module 1110.

With the apparatus for video frame interpolation according to embodiments of the disclosure, generating the pixel optical flow information no longer only depends on the simple optical flow learning to generate the interpolation frame, the interpolation frame is generated based on the semantic optical flow information and the pixel optical flow information by fully extracting and using the visual semantic information in the video. In this way, problems such low efficiency, and image jittering, blurring and serious deformation of the video in the existing method for video frame interpolation are avoided, the efficiency in the process of video frame interpolation is improved, and the frame interpolation effect is improved. Furthermore, unified supervision training is performed in a frame interpolation scene, which further improves the frame interpolation effect.

According to embodiments of the disclosure, the disclosure also provides an electronic device and a readable storage medium.

Figure 13:
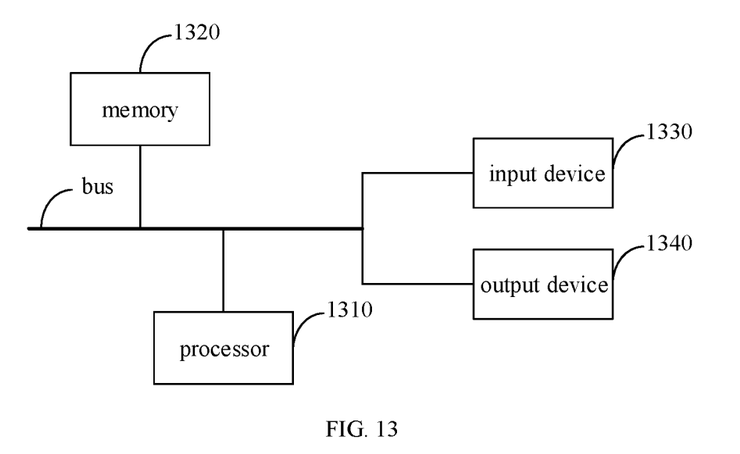
FIG. 13 is a block diagram illustrating an electronic device capable of implementing a method for video frame interpolation according to embodiments of the disclosure.

FIG. 13 is a block diagram illustrating an electronic device capable of implementing a method for video frame interpolation according to embodiments of the disclosure. The electronic device aims to represent various forms of digital computers, such as a laptop computer, a desktop computer, a workstation, a personal digital assistant, a server, a blade server, a mainframe computer and other suitable computer. The electronic device may also represent various forms of mobile devices, such as personal digital processing, a cellular phone, a smart phone, a wearable device and other similar computing device. The components, connections and relationships of the components, and functions of the components illustrated herein are merely examples, and are not intended to limit the implementation of the disclosure described and/or claimed herein.

As illustrated in FIG. 13, the electronic device includes: one or more processors 1310, a memory 1320, and interfaces for connecting various components, including a high-speed interface and a low-speed interface. Various components are connected to each other via different buses, and may be mounted on a common main board or in other ways as required. The processor may process instructions executed within the electronic device, including instructions stored in or on the memory to display graphical information of the GUI (graphical user interface) on an external input/output device (such as a display device coupled to an interface). In other implementations, multiple processors and/or multiple buses may be used together with multiple memories if desired. Similarly, multiple electronic devices may be connected, and each device provides some necessary operations (for example, as a server array, a group of blade servers, or a multiprocessor system). In FIG. 13, a processor 1310 is taken as an example.

The memory 1320 is a non-transitory computer readable storage medium provided by the disclosure. The memory is configured to store instructions executable by at least one processor, to enable the at least one processor to execute the method for video frame interpolation provided by the disclosure. The non-transitory computer readable storage medium provided by the disclosure is configured to store computer instructions. The computer instructions are configured to enable a computer to execute the method for video frame interpolation provided by the disclosure.

As the non-transitory computer readable storage medium, the memory 1320 may be configured to store non-transitory software programs, non-transitory computer executable programs and modules, such as program instructions/module (such as the obtaining module 1100, the first generating module 1120, the second generating module 1130, and the third generating module 1140 illustrated in FIG. 11) corresponding to the method for video frame interpolation according to embodiments of the disclosure. The processor 1310 is configured to execute various functional applications and data processing of the server by operating non-transitory software programs, instructions and modules stored in the memory 1320, that is, implements the method for video frame interpolation according to the above method embodiments.

The memory 1320 may include a storage program region and a storage data region. The storage program region may store an application required by an operating system and at least one function. The storage data region may store data created according to predicted usage of the electronic device. In addition, the memory 1320 may include a high-speed random access memory, and may also include a non-transitory memory, such as at least one disk memory device, a flash memory device, or other non-transitory solid-state memory device. In some embodiments, the memory 1320 may optionally include memories remotely located to the processor 1310, and these remote memories may be connected to the electronic device via a network. Examples of the above network include, but are not limited to, an Internet, an intranet, a local area network, a mobile communication network and combinations thereof.

The electronic device capable of implementing the method for video frame interpolation may also include: an input device 1330 and an output device 1340. The processor 1310, the memory 1320, the input device 1330, and the output device 1340 may be connected via a bus or in other means. In FIG. 13, the bus is taken as an example.

The input device 1330 may receive inputted digital or character information, and generate key signal input related to user setting and function control of the electronic device, such as a touch screen, a keypad, a mouse, a track pad, a touch pad, an indicator stick, one or more mouse buttons, a trackball, a joystick and other input device. The output device 1340 may include a display device, an auxiliary lighting device (e.g., LED), a haptic feedback device (e.g., a vibration motor), and the like. The display device may include, but be not limited to, a liquid crystal display (LCD), a light emitting diode (LED) display, and a plasma display. In some embodiments, the display device may be the touch screen.

The various implementations of the system and technologies described herein may be implemented in a digital electronic circuit system, an integrated circuit system, an application specific ASIC (application specific integrated circuit), a computer hardware, a firmware, a software, and/or combinations thereof. These various implementations may include: being implemented in one or more computer programs. The one or more computer programs may be executed and/or interpreted on a programmable system including at least one programmable processor. The programmable processor may be a special purpose or general purpose programmable processor, may receive data and instructions from a storage system, at least one input device, and at least one output device, and may transmit data and the instructions to the storage system, the at least one input device, and the at least one output device.

These computing programs (also called programs, software, software applications, or codes) include machine instructions of programmable processors, and may be implemented by utilizing high-level procedures and/or object-oriented programming languages, and/or assembly/machine languages. As used herein, the terms "machine readable medium" and "computer readable medium" refer to any computer program product, device, and/or apparatus (such as, a magnetic disk, an optical disk, a memory, a programmable logic device (PLD)) for providing machine instructions and/or data to a programmable processor, including a machine readable medium that receives machine instructions as a machine readable signal. The term "machine readable signal" refers to any signal for providing the machine instructions and/or data to the programmable processor.

To provide interaction with a user, the system and technologies described herein may be implemented on a computer. The computer has a display device (such as, a CRT (cathode ray tube) or a LCD (liquid crystal display) monitor) for displaying information to the user, a keyboard and a pointing device (such as, a mouse or a trackball), through which the user may provide the input to the computer. Other types of devices may also be configured to provide interaction with the user. For example, the feedback provided to the user may be any form of sensory feedback (such as, visual feedback, moderationory feedback, or tactile feedback), and the input from the user may be received in any form (including acoustic input, voice input or tactile input).

The system and technologies described herein may be implemented in a computing system including a background component (such as, a data server), a computing system including a middleware component (such as, an application server), or a computing system including a front-end component (such as, a user computer having a graphical user interface or a web browser through which the user may interact with embodiments of the system and technologies described herein), or a computing system including any combination of such background component, the middleware components and the front-end component. Components of the system may be connected to each other via digital data communication in any form or medium (such as, a communication network). Examples of the communication network include a local area network (LAN), a wide area networks (WAN), and the Internet.

The computer system may include a client and a server. The client and the server are generally remote from each other and generally interact via the communication network. A relationship between the client and the server is generated by computer programs operated on a corresponding computer and having a client-server relationship with each other.

The server may be a cloud server, also known as a cloud computing server or a cloud host, which is a host product in a cloud computing service system, to solve difficult management and weak business scalability in conventional physical host and VPS (virtual private server) services.

With the method for video frame interpolation according to embodiments of the disclosure, generating the pixel optical flow information no longer only depends on the simple optical flow learning to generate the interpolation frame, the interpolation frame is generated based on the semantic optical flow information and the pixel optical flow information by fully extracting and using the visual semantic information in the video. In this way, problems such low efficiency, and image jittering, blurring and serious deformation of the video in the existing method for video frame interpolation are avoided, the efficiency in the process of video frame interpolation is improved, and the frame interpolation effect is improved. Furthermore, unified supervision training is performed in a frame interpolation scene, which further improves the frame interpolation effect.

According to embodiments of the disclosure, the disclosure also provides a computer program product including a computer program. The computer program is caused to implement the above method for video frame interpolation according to embodiments of the disclosure when executed by a processor.

It should be understood that, steps may be reordered, added or deleted by utilizing flows in the various forms illustrated above. For example, the steps described in the disclosure may be executed in parallel, sequentially or in different orders, so long as desired results of the technical solution disclosed in the disclosure may be achieved, there is no limitation here.

The above detailed implementations do not limit the protection scope of the disclosure. It should be understood by the skilled in the art that various modifications, combinations, sub-combinations and substitutions may be made based on design requirements and other factors. Any modification, equivalent substitution and improvement made within the principle of the disclosure shall be included in the protection scope of disclosure.

What is claimed is:

1. A method for video frame interpolation, comprising:
    obtaining a first visual semantic feature and first pixel information of a first frame, and obtaining a second visual semantic feature and second pixel information of a second frame, wherein the first frame and the second frame are adjacent frames in a video;
    generating semantic optical flow information based on the first visual semantic feature and the second visual semantic feature;
    generating pixel optical flow information based on the first pixel information and the second pixel information; and
    generating an interpolation frame between the first frame and the second frame based on the semantic optical flow information and the pixel optical flow information, and interpolating the interpolation frame between the first frame and the second frame.

2. The method of claim 1, wherein generating the semantic optical flow information based on the first visual semantic feature and the second visual semantic feature comprises:
    obtaining a third visual semantic feature by splicing the first visual semantic feature and the second visual semantic feature; and generating the semantic optical flow information by performing optical flow learning on the third visual semantic feature.

3. The method of claim 1, wherein generating the pixel optical flow information based on the first pixel information and the second pixel information comprises:
obtaining third pixel information by splicing the first pixel information and the second pixel information; and
generating the pixel optical flow information by performing optical flow learning on the third pixel information.

4. The method of claim 1, wherein generating the interpolation frame between the first frame image and the second frame image based on the semantic optical flow information and the pixel optical flow information comprises:
generating a fourth visual semantic feature based on the semantic optical flow information, the first visual semantic feature and the second visual semantic feature;
generating fourth pixel information based on the pixel optical flow information, the first pixel information and the second pixel information; and
generating the interpolation frame based on the fourth visual semantic feature and the fourth pixel information.

5. The method of claim 2, wherein generating the interpolation frame between the first frame image and the second frame image based on the semantic optical flow information and the pixel optical flow information comprises:
generating a fourth visual semantic feature based on the semantic optical flow information, the first visual semantic feature and the second visual semantic feature;
generating fourth pixel information based on the pixel optical flow information, the first pixel information and the second pixel information; and
generating the interpolation frame based on the fourth visual semantic feature and the fourth pixel information.

6. The method of claim 3, wherein generating the interpolation frame between the first frame image and the second frame image based on the semantic optical flow information and the pixel optical flow information comprises:
generating a fourth visual semantic feature based on the semantic optical flow information, the first visual semantic feature and the second visual semantic feature;
generating fourth pixel information based on the pixel optical flow information, the first pixel information and the second pixel information; and
generating the interpolation frame based on the fourth visual semantic feature and the fourth pixel information.

7. The method of claim 4, wherein generating the fourth visual semantic feature based on the semantic optical flow information, the first visual semantic feature and the second visual semantic feature comprises:
generating the third visual semantic feature by splicing the first visual semantic feature and the second visual semantic feature; and
generating the fourth visual semantic feature by performing track mapping on feature information in the third visual semantic feature based on the semantic optical flow information.

8. The method of claim 4, wherein generating the fourth pixel information based on the pixel optical flow information, the first pixel information and the second pixel information comprises:
generating the third pixel information by splicing the first pixel information and the second pixel information; and
generating the fourth pixel information by performing track mapping on pixels in the third pixel information based on the pixel optical flow information.

9. An electronic device, comprising:
at least one processor; and
a memory, communicatively coupled to the at least one processor,
wherein the memory is configured to store instructions executable by the at least one processor, and the at least one processor is caused to execute a method for video frame interpolation when the instructions are executed by the at least one processor, the method comprising:
obtaining a first visual semantic feature and first pixel information of a first frame, and obtaining a second visual semantic feature and second pixel information of a second frame, wherein the first frame and the second frame are adjacent frames in a video;
generating semantic optical flow information based on the first visual semantic feature and the second visual semantic feature;
generating pixel optical flow information based on the first pixel information and the second pixel information; and
generating an interpolation frame between the first frame and the second frame based on the semantic optical flow information and the pixel optical flow information, and interpolating the interpolation frame between the first frame and the second frame.

10. The electronic device of claim 9, wherein generating the semantic optical flow information based on the first visual semantic feature and the second visual semantic feature comprises:
obtaining a third visual semantic feature by splicing the first visual semantic feature and the second visual semantic feature; and
generating the semantic optical flow information by performing optical flow learning on the third visual semantic feature.

11. The electronic device of claim 9, wherein generating the pixel optical flow information based on the first pixel information and the second pixel information comprises:
obtaining third pixel information by splicing the first pixel information and the second pixel information; and
generating the pixel optical flow information by performing optical flow learning on the third pixel information.

12. The electronic device of claim 9, wherein generating the interpolation frame between the first frame image and the second frame image based on the semantic optical flow information and the pixel optical flow information comprises:
generating a fourth visual semantic feature based on the semantic optical flow information, the first visual semantic feature and the second visual semantic feature;
generating fourth pixel information based on the pixel optical flow information, the first pixel information and the second pixel information; and
generating the interpolation frame based on the fourth visual semantic feature and the fourth pixel information.

13. The electronic device of claim 12, wherein generating the fourth visual semantic feature based on the semantic optical flow information, the first visual semantic feature and the second visual semantic feature comprises:

generating the third visual semantic feature by splicing the first visual semantic feature and the second visual semantic feature; and generating the fourth visual semantic feature by performing track mapping on feature information in the third visual semantic feature based on the semantic optical flow information.

14. The electronic device of claim 12, wherein generating the fourth pixel information based on the pixel optical flow information, the first pixel information and the second pixel information comprises:

generating the third pixel information by splicing the first pixel information and the second pixel information; and generating the fourth pixel information by performing track mapping on pixels in the third pixel information based on the pixel optical flow information.

15. A non-transitory computer readable storage medium having computer instructions stored thereon, wherein the computer instructions are configured to cause a computer to execute a method for video frame interpolation, the method comprising:

obtaining a first visual semantic feature and first pixel information of a first frame, and obtaining a second visual semantic feature and second pixel information of a second frame, wherein the first frame and the second frame are adjacent frames in a video;

generating semantic optical flow information based on the first visual semantic feature and the second visual semantic feature;

generating pixel optical flow information based on the first pixel information and the second pixel information; and generating an interpolation frame between the first frame and the second frame based on the semantic optical flow information and the pixel optical flow information, and interpolating the interpolation frame between the first frame and the second frame.

16. The non-transitory computer readable storage medium of claim 15, wherein generating the semantic optical flow information based on the first visual semantic feature and the second visual semantic feature comprises:

obtaining a third visual semantic feature by splicing the first visual semantic feature and the second visual semantic feature; and generating the semantic optical flow information by performing optical flow learning on the third visual semantic feature.

17. The non-transitory computer readable storage medium of claim 15, wherein generating the pixel optical flow information based on the first pixel information and the second pixel information comprises:

obtaining third pixel information by splicing the first pixel information and the second pixel information; and generating the pixel optical flow information by performing optical flow learning on the third pixel information.

18. The non-transitory computer readable storage medium of claim 15, wherein generating the interpolation frame between the first frame image and the second frame image based on the semantic optical flow information and the pixel optical flow information comprises:

generating a fourth visual semantic feature based on the semantic optical flow information, the first visual semantic feature and the second visual semantic feature;

generating fourth pixel information based on the pixel optical flow information, the first pixel information and the second pixel information; and generating the interpolation frame based on the fourth visual semantic feature and the fourth pixel information.

19. The non-transitory computer readable storage medium of claim 18, wherein generating the fourth visual semantic feature based on the semantic optical flow information, the first visual semantic feature and the second visual semantic feature comprises:

generating the third visual semantic feature by splicing the first visual semantic feature and the second visual semantic feature; and generating the fourth visual semantic feature by performing track mapping on feature information in the third visual semantic feature based on the semantic optical flow information.

20. The non-transitory computer readable storage medium of claim 18, wherein generating the fourth pixel information based on the pixel optical flow information, the first pixel information and the second pixel information comprises:

generating the third pixel information by splicing the first pixel information and the second pixel information; and generating the fourth pixel information by performing track mapping on pixels in the third pixel information based on the pixel optical flow information.

* * * * *